United States Patent

[11] 3,589,050

[72] Inventor Orlan S. Niehuss
705 Gary St., Augusta, Ga. 30904

[21] Appl. No. 817,740
[22] Filed Apr. 21, 1969
[45] Patented June 29, 1971

[54] TELEPHONE SET DIRECTORY
8 Claims, 4 Drawing Figs.

[52] U.S. Cl. .......... 40/336, 40/96, 40/118
[51] Int. Cl. .......... G09f 3/00
[50] Field of Search .......... 40/96, 96.5, 99, 336, 118, 32; 281/6

[56] References Cited

UNITED STATES PATENTS

| | | | |
|---|---|---|---|
| 1,381,825 | 6/1921 | Hanlon .......... | 281/6 |
| 2,540,908 | 2/1951 | Pinkerman .......... | 40/336 X |
| 2,610,867 | 9/1952 | Hamilton .......... | 281/6 |
| 3,343,291 | 9/1967 | Levang et al. .......... | 40/336 X |
| 3,395,472 | 8/1968 | Look .......... | 40/32 |

*Primary Examiner*—Robert W. Michell
*Assistant Examiner*—L. R. Oremland
*Attorney*—Alexander & Dowell

ABSTRACT: The directory has a base receiving thereon a telephone set, and has a pair of parallel uprights on the base adjacent its rear end, in which a lower drum is journaled. A pair of parallel upright extensions are journaled on the upper ends of the first upright so as to be able to be swung downwardly and forwardly over the base, the upright extensions being connected together to move as a unit. An upper drum is journaled in the upper ends of the upright extensions with knobs on the drum shaft for rotating the upper drum. An endless tape runs around the two drums and is maintained taut when the upright extensions are in normal extended position, and is relaxed when the upright extensions are swung down over the base.

INVENTOR
ORIAN S. NIEHUSS

BY [signature]

ATTORNEYS

INVENTOR
ORIAN S. NIEHUSS

BY

ATTORNEYS

TELEPHONE SET DIRECTORY

DESCRIPTION OF INVENTION

This invention is a novel telephone set directory adapted to be placed adjacent the telephone set, or to support the telephone set when placed thereon, in the direct line of vision of a person using the telephone to assist in readily determining the correct telephone number of a person or party to be called.

The principal object of the invention is to provide a directory of the above type having a base upon which the telephone set may readily rest, the base having at the end remote from the telephone a pair of substantially vertical uprights and upright extensions which are hinged together respectively so that the upright extensions can be simultaneously swung on the uprights from a vertical position down to a substantially horizontal position. The pair of uprights carry a rotatable drum, and the upright extensions carry a second rotatable drum around which runs an endless tape on which the often-used telephone numbers may be marked, so that when the second drum is rotated the desired portion of the endless tape may be brought into the direct line of vision of the operator at the side of the tape adjacent the telephone set, the tape being taut when the upright extensions are in substantially vertical position, and being relaxed when the upright extensions are swung downwardly. On the upright extensions, at the side remote from the telephone set, is a plate so positioned that when the upright extensions are hinged downwardly the plate will underlie the relaxed upper run of the endless tape and form a support for the tape enabling the operator to readily write in the name and telephone number of a party not heretofore appearing on the endless tape.

Another object of the invention is to provide a telephone set directory in which the lower drum is covered with a sheet rubber layer, while the upper drum is covered with a thick foam rubber layer to provide the necessary friction between the upper drum and endless tape enabling the tape to be moved by and with the rotation of the upper drum.

I will explain the invention with reference to the accompanying drawings which illustrate one practical embodiment thereof to enable others familiar with the art to adopt and use the same; and will summarize in the claims, the novel features of construction, and novel combinations of parts, for which protection is desired.

Figure 1:
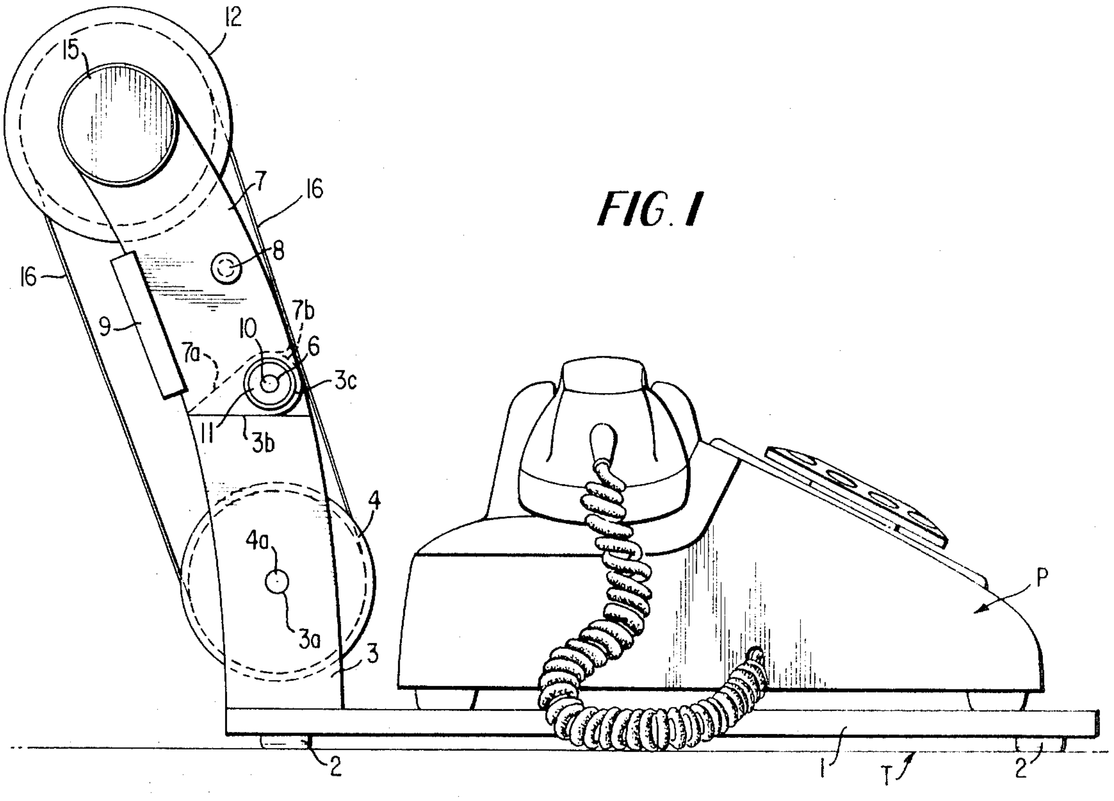
FIG. 1 is a side elevation of the telephone set directory showing an ordinary telephone set resting on the base thereof.
Figure 2:
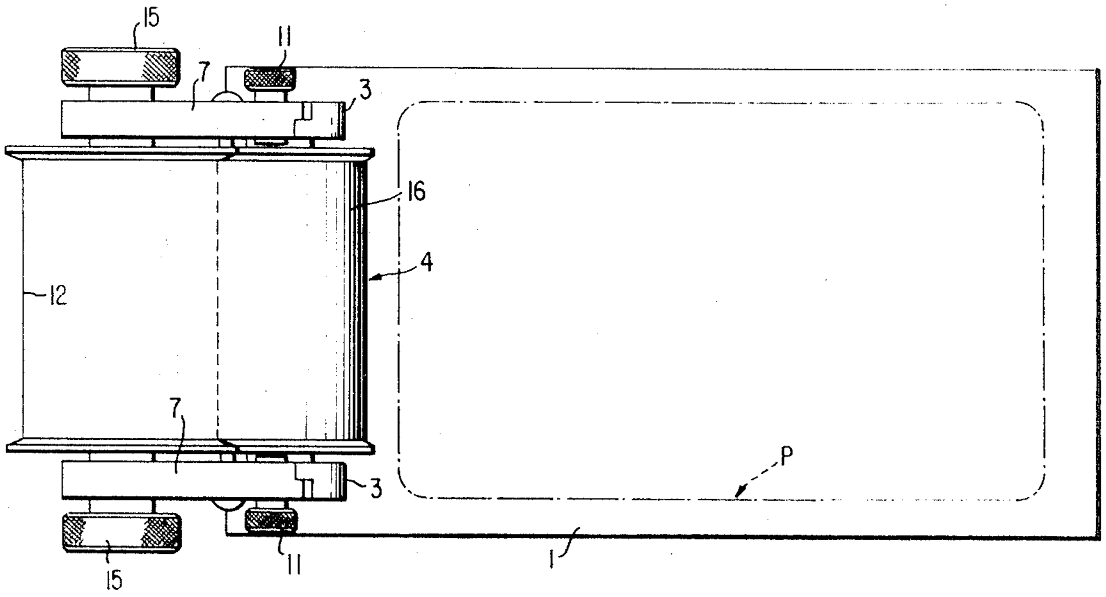
FIG. 2 is a top plan view of the parts shown in FIG. 1.
Figures 3, 4:
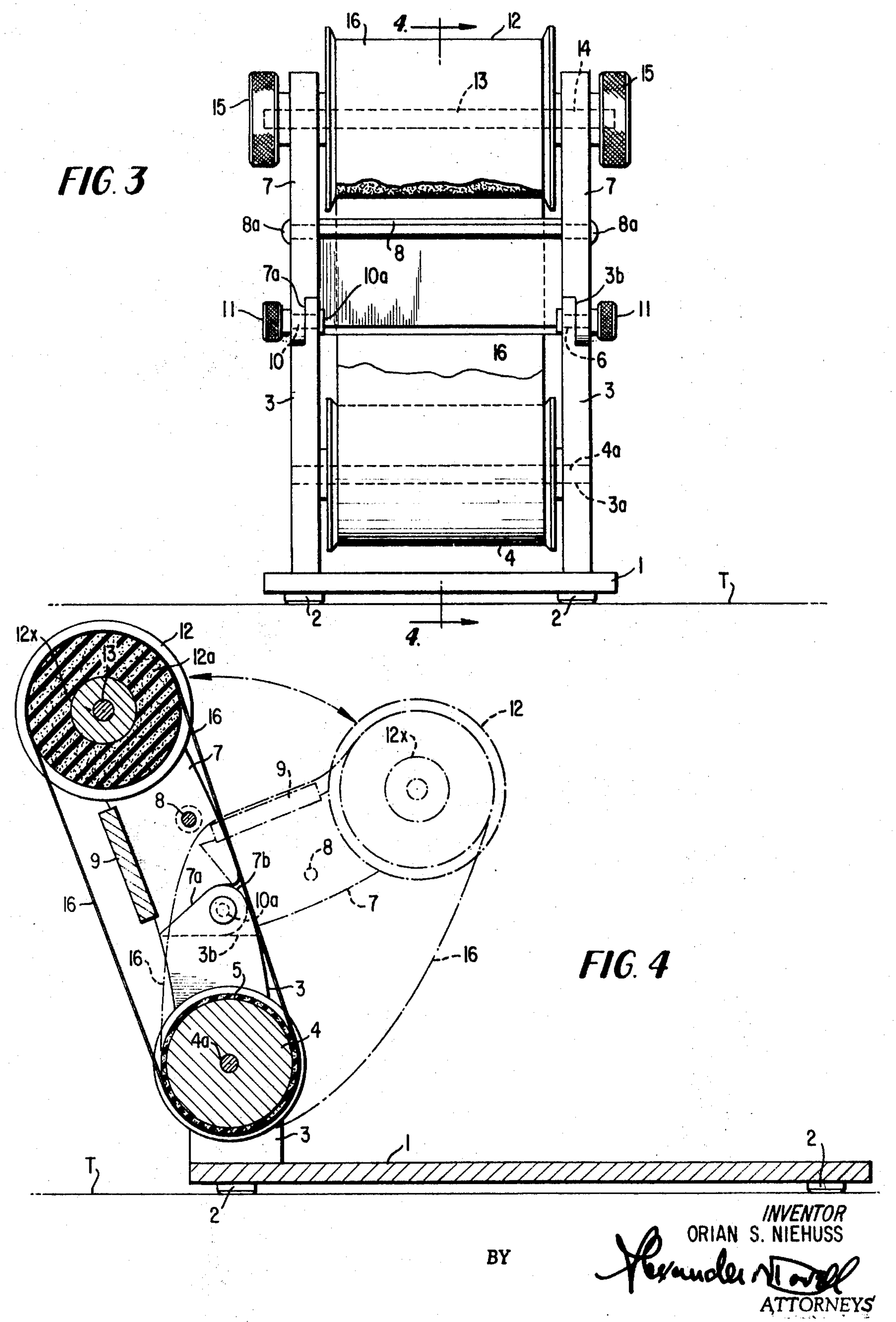
FIG. 3 is a front elevational view of the telephone set directory shown in FIG. 1.
FIG. 4 is a vertical section taken on the line 4—4, FIG. 3.

As shown, my novel telephone set directory preferably comprises a base 1 adapted to be placed upon a table top T or the like, the same being provided with rubber pads 2 on its lower face adjacent the four corners of the base. Preferably but not necessarily the base 1 is of sufficient length and width to support towards the front end thereof a telephone set P as shown in FIGS. 1 and 2. Extending upwardly from the rear end of the base 1 in rear of the telephone set P are a pair of spaced parallel uprights 3, the same being preferably curves slightly upwardly and rearwardly throughout their heights as shown in FIGS. 1 and 4, said uprights 3 being secured to the base 1 by gluing or by screws or the like so as to remain fixed upon the base 1. The uprights 3 extend upwardly from base 1 and terminate at a height at about opposite the upper portion of the telephone set P. Journaled between the uprights 3 above the base 1 is a horizontal drum 4 having a shaft 4*a* whose ends engage bores 3*a* therefore in the uprights 3. Preferably the lower drum 4 is covered with a sheet rubber layer 5, FIG. 4. The upper ends of the uprights 3 are rabbetted as at 3*b* on their outer faces, the thin portion of the rabbets 3*b* being rounded as to 3*c* at their forward ends. The rabbetted portions 3*b* of both uprights 3 are provided with aligned bores 6 for the purpose hereinafter described.

On each of the uprights 3 are extension uprights 7 which are also preferably slightly upwardly and rearwardly curved as shown in FIGS. 1 and 4, said extensions 7 being secured together in spaced parallel relation by means of a bolt 8 passing therethrough having its ends 8*a* riveted over the outer faces of the extensions 7.

Connecting the rear faces of the extensions 7 is a plate 9, FIGS. 1 and 4, which is preferably secured thereto by adhesive or by rabbetted the like to further maintain the extensions 7 in spaced relation, the plate 9 being disposed between the upper and lower ends of the extensions 7, and serving a further purpose hereinafter described.

The lower end of each extension 7 is rabbetted on its inner face as at 7*a*, and the forward ends of the rabbetted portions 7*a* are rounded as at 7*b*, and are provided with bores registering with the bores 6 of the rabbetted portions 3*b*. Extending through the bores 6 in the rabbetted portions 3*b* and the registering bores in the rabbetted portions 7*a* are bolts 10 having on their inner ends heads 10*a* engaging the inner faces of the uprights 3, said bolts 10 carrying thumb nuts 11 on their outer ends whereby the rabbetted portions 3*b*, 7*a* may be frictionally maintained in adjusted angular relation.

Between the upper ends of the extension 7 is an upper drum 12 keyed on a shaft 13 journaled on bores 14 in the upper ends of the extensions 7, as shown more particularly in FIG. 3, said shaft 1*e* carrying on its outer ends knurled thumb nuts 15 whereby when the nuts 15 are manually rotated, the shaft 13 and upper drum 12 will be correspondingly rotated. The upper drum 12 preferably has a solid core 12*x* mounted upon the shaft 13, the core 12*x* being covered with a thick foam rubber layer 12*a*, as shown in FIG. 4.

Around the drums 4 and 12 extends an endless tape 16 of paper or other material upon which the names and telephone numbers of various individuals or companies may be written for the convenience of the person using the telephone set P. The tape 16, while endless, is of such length that when the extensions 7 are in the position shown in full lines in FIG. 4, the tape will be sufficiently taut to cause the tape to be moved by and with the rotation of the upper drum 12. However, when the extension 7 are swung downwardly as a unit, into the position shown in dot-and-dash lines in FIG. 4, the endless tape 16 will be loose or relaxed and the upper run of the endless tape in such position will rest loosely upon the plate 9 carried by the extensions 7, and will be backed up by said plate, so that the person using the telephone set may conveniently write a new name and telephone number upon the relaxed strip 16 for possible future reference. However, when the extensions 7 are again raised from the dot-and-dash position into the full line position shown in FIG. 4, the endless tape 16 will be sufficiently taut to cause the tape to move by and with the rotation of the upper drum 12.

Obviously the above construction with the base 1 removed could be used as a mere attachment to a telephone set. It will be noted that since the pivots 10 for the uprights 3 and the extensions 7 are offset from the axis extending through the lower drum and upper drum, the tension in the tape 16 when the extensions 7 are in the position shown in full lines in FIG. 4 can have no tendency to swing the extensions 7 down into the position shown in dot-and-dash lines in FIG. 4. Also, when the extensions are in the position shown in full lines in FIG. 4 the curvature of the uprights 3 and 7 will bring the forward run of the endless tape 16 into the direct line of vision and substantially on the same level as the eye of the operator using the telephone set P.

I claim:

1. A directory for telephone sets or the like comprising a horizontal base adapted to receive a telephone; a pair of parallel uprights on the base; a lower drum journaled in said uprights above the base; a pair of parallel upright extensions journaled on the upper ends of the first uprights and adapted to be swung downwardly; means for maintaining said upright extensions in an extended upright position relative to said parallel uprights; means connecting the upright extensions to cause same to swing as a unit; an upper drum journaled in the upper ends of said upright extensions; means for manually rotating the upper drum; and an endless tape running around the said drums and adapted to be maintained taut when the upright extensions are in normal extended positions, and to be relaxed when the upright extensions are swung down.

2. In a directory as set forth in claim 1, said uprights being upwardly curved and having their upper ends rabbetted; said upright extensions being upwardly curved and having their lower ends rabbetted to receive the rabbetted upper ends of the first uprights; bolts extending through the rabbetted ends; and thumb nuts on said bolts for maintaining the extensions in adjusted positions.

3. A directory for telephone sets or the like comprising a horizontal base adapted to receive thereon a telephone set; a pair of parallel uprights on the base adjacent the rear end thereof; a lower drum journaled in said uprights above the base; a pair of parallel upright extensions journaled on the upper ends of the first uprights and adapted to be swung downwardly and forwardly over the base; means connecting the upright extensions to cause same to swing as a unit; means for maintaining said upright extensions in an extended upright position relative to said parallel uprights; an upper drum journaled in the upper ends of said upright extensions; means for manually rotating the upper drum; and an endless tape running around the said drums and adapted to be maintained taut when the upright extensions are in normal extended positions, to be relaxed when the upright extensions are swung down over the base.

4. In a directory as set forth in claim 3, said uprights being upwardly and rearwardly curved and having their upper ends rabbetted; said upright extensions being upwardly and rearwardly curved and having their lower ends rabbetted to receive the rabbetted upper ends of the first uprights; bolts extending through the rabbetted ends; thumb nuts on said bolts for maintaining the extensions in adjusted positions; the bolts being disposed forwardly of the axis extending through the journals of the drums.

5. A directory for telephone sets or the like comprising a base; a pair of parallel uprights on the base; a lower drum journaled in said uprights above the base; a pair of parallel upright extensions journaled on the upper ends of the first uprights and adapted to be swung downwardly; means connecting the upright extensions to cause same to swing as a unit; an upper drum journaled in the upper ends of said upright extensions; means for manually rotating the upper drum; and an endless tape running around the said drums and adapted to be maintained taut when the upright extensions are in normal extended positions, and to be relaxed when the upright extensions are swung down, said connecting means comprising a bolt extending through the upright extensions below the upper drum and having its outer ends riveted over the outer faces of the extensions; and a plate connecting the rear faces of the extensions below the upper drum and adapted to backup the endless tape when the latter is relaxed to permit the tape to be readily written upon.

6. In a directory as set forth in claim 5, said lower drum being covered with a sheet rubber layer; and said upper drum being covered with a thick foam rubber layer.

7. A directory for telephone sets or the like comprising a base adapted to receive thereon a telephone set; a pair of parallel uprights on the base adjacent the rear end thereof; a lower drum journaled in said uprights above the base; a pair of parallel upright extensions journaled on the upper ends of the first uprights and adapted to be swung downwardly and forwardly over the base; means connecting the upright extensions to cause same to swing as a unit; an upper drum journaled in the upper ends of said upright extensions; means for manually rotating the upper drum; and an endless tape running around the said drums and adapted to be maintained taut when the upright extensions are in normal extended positions, to be relaxed when the upright extensions are swung down over the base; said connecting means comprising a bolt extending through the upright extensions below the upper drum and having its outer ends riveted over the outer faces of the extensions and a plate connecting the rear faces of the extensions below the upper drum and adapted to backup and endless tape when the latter is relaxed to permit the tape to be readily written upon.

8. In a directory as set forth in claim 7, said lower drum being covered with a sheet rubber layer; and said upper drum being covered with a thick foam rubber layer.